UNITED STATES PATENT OFFICE.

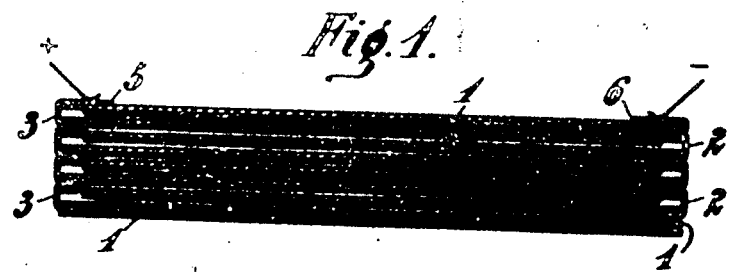
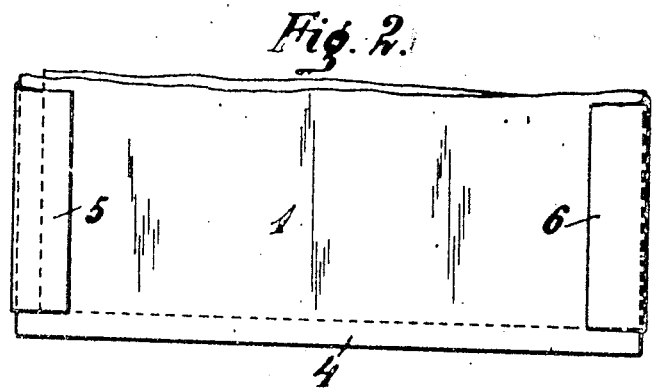
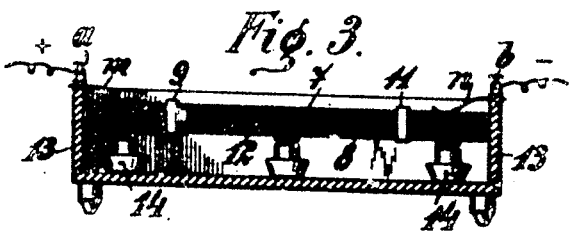
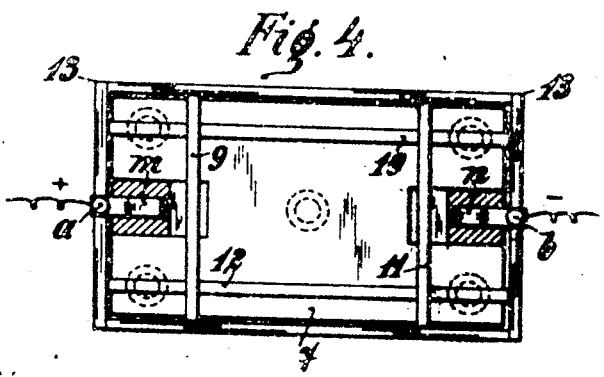

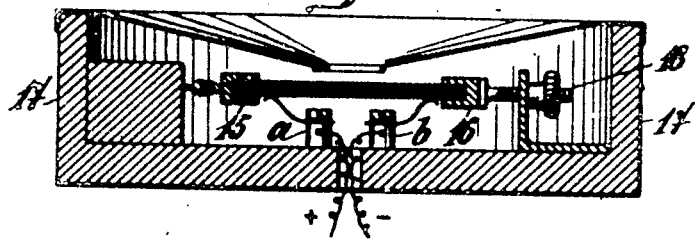
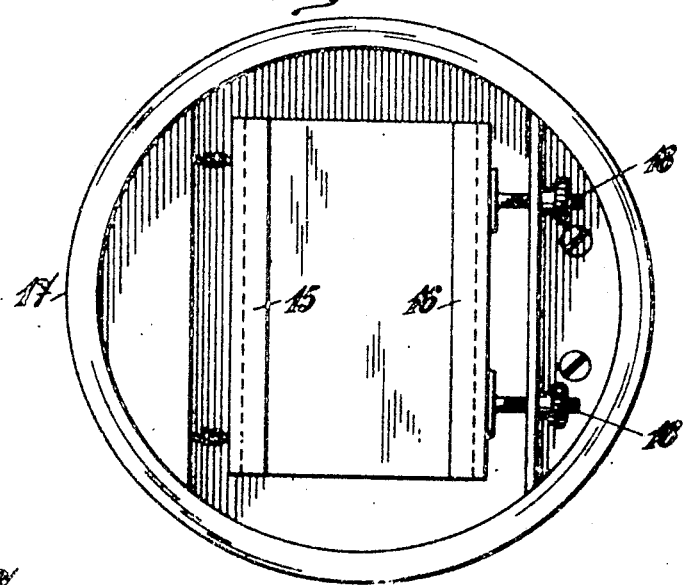
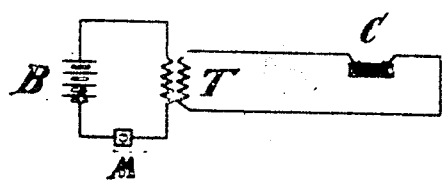
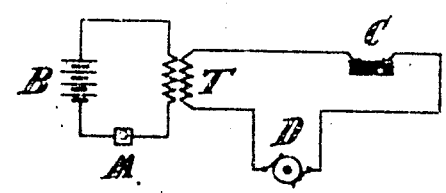
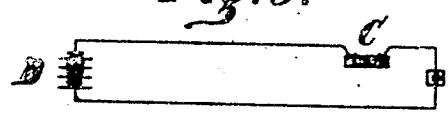
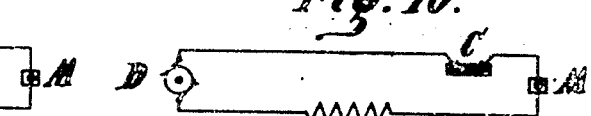

KAREL ORT, OF KOSTICE ON EGER, JOSEF RIEGER, OF DOMAUSICE, NEAR LOUNY, AND JOSEF KAREL ORT, OF KOSTICE ON EGER, AUSTRIA-HUNGARY.

DEVICE TO BE USED AS TELEPHONE-RECEIVER.

963,934.

Specification of Letters Patent. Patented July 12, 1910.

Application filed November 29, 1907. Serial No. 404,444.

*To all whom it may concern:*

Be it known that we, KAREL ORT, of Kostice on Eger, JOSEF RIEGER, of Domausice, near Louny, and JOSEF KAREL ORT, of Kostice on Eger, all three in the Kingdom of Bohemia, Austrian Empire, and all three subjects of the Austrian Emperor, have invented new and useful Improvements in Devices to be Used as Telephone-Receivers, of which the following is the specification.

Our invention relates to improvements in sound-receiving devices and particularly to an arrangement of condenser to be used as a telephone receiver, serving to transmit sounds by means of electric current; and the objects of our improvement are, first, to provide a cheap receiver for articulated sounds, speeches, musical sounds and singing; second, to provide a system by which instrumental musical tones, singing, etc., may be transmitted and reproduced with great naturalness and distinctness, and third, to provide an arrangement of condenser-receiver for use for the above purposes which will vibrate correctly by means of the interposition of an appropriate stretching device.

We attain these objects by the apparatus illustrated in the accompanying drawings, in which—

Figures 1 and 2 show a cross-section and a horizontal view of the receiving device; Figs. 3 and 4 a cross section and a vertical view of a receiving disk mounted on porcelain insulators; Figs. 5 and 6 a cross section and a plan view respectively of a telephone receiver showing another example of application of the diaphragm receiving device; Figs. 7 to 10 are examples of various arrangements of circuits.

Similar characters refer to similar parts throughout the several views.

Our condenser receiving disk is composed of two series of parallel superposed foils, which are separated from each other by papers or the diaphragms 1, one series of said foils being conductively connected together and to the + pole at one end 3, of the disk, while the other series is conductively connected together at the other end 6, and then to the — pole of the circuit. It is preferably arranged by making the papers broader than the foils, and the foils at one end extending beyond the paper, and therefore the paper projecting on three sides beyond the foils, as shown for instance in Fig. 2 by the rim 4. The projecting ends 5 and 6 of the foils are then alternately lapped over as at 2 and 3, so that the foils of the + system thus are conductively connected together on one side, the foils of the — system conductively connected together on the opposite side, and each foil is separated from the next foil by a dielectric elastical thin layer of paper, mica or the like, and then tension is given by an appropriate device to all the paper layers together. Said combined disk is interposed into the circuit by its + clamp (a) and — clamp (b) in an appropriate way.

Said diaphragm sound-receiving device can be arranged horizontally upon insulators 14 in a casing 13, covered on both sides with paper or the like 7, 8, and provided with elastic bands, 9 to 12, and conducting springs m and n upon conducting plates, which thus connect each system of said foils one with the + and the other with the — pole, by means of clamps (a) and (b).

Another example of application of our combined diaphragm disk, as used for the telephone receiver 17, is shown in Figs. 5 and 6, said apparatus being hung by its conducting rims 15 and 16 elastically in its casing 17 so that its insulating diaphragms of paper or the like may be conveniently stretched all at once and their tension regulated by an appropriate device, which consists preferably of regulating screws 18 as shown.

Referring to Figs. 7 to 10, the condenser receiver, which in these figures is lettered C is interpolated either in a circuit having a transformer T, by means of which it is connected with the telephonic circuit, having a battery of elements at B, and a microphone at M (Fig. 7), or it is installed without a transformer (Fig. 9); in both preceding cases a continuous current dynamo D can be interpolated into the circuit as is shown in Figs. 8 and 10. Said dynamo strengthens the sound considerably; but in such a combination care must be taken to suppress the sounds of the machine, which as known are produced by the collector and can be suppressed either by the transformer T itself (Fig. 8), or by special coils K (Fig. 10).

The action of diaphragms in our combined transmitting disk appears in comparison to the usual diaphragms to be multiplied, and the vibrations caused by the successive currents produce a very strong and exact reproduction of original sounds. No batteries are used directly in the circuit of the condenser, and by the arrangement provided, the condenser foils are stretched throughout their whole planes. Said foils, therefore, will vibrate easily even under the influence of weak microphonic currents, the latter being transformed into higher tension in the induction coil.

We claim:—

1. A device to be used as a telephone receiver, which consists of superposed diaphragms of conducting material, alternate layers of the same being connected together in one series to form a continuous conductor and connected to the positive pole of an electric circuit, and the remaining alternate layers being connected in a second series and connected to the negative pole of said circuit, a layer of elastic dielectric material interposed between each two conducting diaphragms, and means for elastically suspending the whole.

2. A device to be used as a telephone receiver, which consists of superposed diaphragms of conducting material, alternate layers of the same being connected together in one series to form a continuous conductor and connected to the positive pole of an electric circuit, and the remaining alternate layers being connected in a second series and connected to the negative pole of said circuit, a layer of elastic dielectric material interposed between each two conducting diaphragms, means for elastically suspending the whole, and means for regulating the tension of the elastic layers.

3. A device to be used as a telephone receiver, which consists of superposed diaphragms of conducting material, alternate layers of the same being connected together in one series to form a continuous conductor and connected to the positive pole of an electric circuit, and the remaining alternate layers being connected in a second series and connected to the negative pole of said circuit, a layer of elastic dielectric material interposed between each two conducting diaphragms, a suitable casing for inclosing the layers and in which they are elastically suspended, and regulating screws for adjusting the tension of the elastic layers.

4. A device to be used as a telephone receiver, which consists of superposed diaphragms of conducting material, alternate layers of the same being connected together in one series to form a continuous conductor and connected to the positive pole of an electric circuit, and the remaining alternate layers being connected in a second series and connected to the negative pole of said circuit, a layer of elastic dielectric material interposed between each two conducting diaphragms, means for elastically suspending the layers, and means for regulating the tension of the elastic layers, the whole being interposed into a circuit having a transformer, the primary of which is included in a circuit having a suitable source of energy and a microphone transmitter.

5. A system for transmitting and reproducing sound, comprising a suitable source of electrical energy, a circuit including said source of energy, a telephone transmitter interposed in said circuit, a transformer, a circuit including the secondary of said transformer, a condenser interposed in said circuit, said condenser being formed of alternate layers of conducting and dielectric elastic material, means for elastically suspending the said layers, and means for regulating the tension of the layers.

In testimony whereof we affix our signatures in presence of two witnesses.

KAREL ORT.
JOSEF RIEGER.
JOSEF KAREL ORT.

Witnesses:
ADOLPH FISCHER,
LADISLAV VOJÁČEK.